(12) United States Patent
Hengeveld et al.

(10) Patent No.: US 7,917,748 B2
(45) Date of Patent: Mar. 29, 2011

(54) SECURE GROUP SECRET DISTRIBUTION

(75) Inventors: Thomas Andrew Hengeveld, Hollis, NH (US); Dennis Michael Martinez, Westford, MA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 935 days.

(21) Appl. No.: 10/280,354

(22) Filed: Oct. 25, 2002

(65) Prior Publication Data

US 2004/0083363 A1    Apr. 29, 2004

(51) Int. Cl.
*H04L 29/06* (2006.01)

(52) U.S. Cl. ........ 713/163; 713/150; 709/245; 380/255; 380/277; 380/278

(58) Field of Classification Search .......... 380/273, 380/255, 277, 278; 713/200, 163, 150; 709/245
See application file for complete search history.

(56) References Cited

U.S. PATENT DOCUMENTS

| | | | |
|---|---|---|---|
| 4,905,302 A | 2/1990 | Childress et al. | |
| 5,418,854 A | 5/1995 | Kaufman et al. | |
| 5,426,700 A * | 6/1995 | Berson | 713/186 |
| 5,528,691 A | 6/1996 | Rosauer et al. | 380/21 |
| 5,619,572 A | 4/1997 | Sowa | 380/9 |
| 5,768,380 A * | 6/1998 | Rosauer et al. | 380/273 |
| 6,002,770 A * | 12/1999 | Tomko et al. | 380/44 |
| 6,085,323 A | 7/2000 | Shimizu et al. | |
| 6,226,618 B1 | 5/2001 | Downs et al. | |
| 6,266,420 B1 | 7/2001 | Langford et al. | |
| 6,816,966 B1 * | 11/2004 | Gupta et al. | 713/163 |
| 6,862,684 B1 * | 3/2005 | DiGiorgio | 713/163 |
| 6,934,839 B1 * | 8/2005 | Pagel | 713/156 |
| 7,055,030 B2 | 5/2006 | Negawa | |
| 2002/0019932 A1 * | 2/2002 | Toh et al. | 713/155 |
| 2002/0019944 A1 * | 2/2002 | Kou | 713/200 |
| 2002/0144155 A1 * | 10/2002 | Bate et al. | 713/201 |
| 2003/0031322 A1 | 2/2003 | Beckmann et al. | |
| 2003/0037160 A1 * | 2/2003 | Wall et al. | 709/233 |
| 2003/0149874 A1 | 8/2003 | Balfanz et al. | |
| 2003/0163700 A1 * | 8/2003 | Paatero | 713/175 |
| 2004/0044891 A1 * | 3/2004 | Hanzlik et al. | 713/150 |

* cited by examiner

*Primary Examiner* — Edan Orgad
*Assistant Examiner* — Roderick Tolentino
(74) *Attorney, Agent, or Firm* — Allen, Dyer, Doppelt, Milbrath & Gilchrist, P.A.

(57) ABSTRACT

A method for distributing group secrets (e.g., group ID and password combinations) for use in communication systems such as trunked radio communication systems. A user group record containing one or more group secrets is encrypted at an administrator using a user secret (e.g., a user ID and password combination) known to the administrator and to a communication device. The encrypted user group record is then distributed to the communication device where it is decrypted using the user secret.

20 Claims, 3 Drawing Sheets

US 7,917,748 B2

SECURE GROUP SECRET DISTRIBUTION

RELATED APPLICATIONS

The present application is related to commonly assigned, co-pending U.S. patent application Ser. No. 10/228,747, entitled SECURE ENCRYPTION KEY DISTRIBUTION, and filed on Aug. 27, 2002.

FIELD OF THE INVENTION

The present invention relates to encrypted communication systems and, more particularly, to the distribution of group secrets.

BACKGROUND OF THE INVENTION

Communication systems often use data encryption techniques to transfer communication data (i.e., traffic) in a secure manner. Security is provided through the use of encryption keys that are used by communication devices (e.g., mobile radios) to encrypt and decrypt the traffic. A common encryption technique for use in communication systems, especially trunked radio communication systems, is a symmetric encryption system (SES) in which the same traffic encryption key is used by a sender to encrypt traffic and by one or more receivers to decrypt the traffic. Typically, a common traffic encryption key is shared by a group of authorized users (e.g., members of a police or fire department) and is updated periodically to increase security. In operation, updates to group traffic encryption keys (GTKs) are transferred to communication devices of all authorized group members so that they may encrypt/decrypt traffic to/from other group members. To preserve the integrity of an SES communication system, the communication system needs to prevent unauthorized individuals from accessing the GTKs.

FIG. 1 depicts a typical encryption key distribution system for distributing GTKs to enable secure communications between group member communication devices, e.g., the communication devices of a group of authorized users. The distribution system includes a key administrator 102 that generates the GTKs, a key distribution and storage facility 104 ("distribution facility") for storing and distributing the GTKs, and a plurality of group devices (represented by group member #1 communication device 100a and group member #2 communication device 100b) that use the GTKs to encrypt/decrypt traffic between group member communication devices 100a, b. Typical encryption key distribution systems are described in U.S. Pat. No. 5,528,691 to Rosauer et al., U.S. Pat. No. 5,619,572 to Sowa, and U.S. Pat. No. 5,768,380 to Rosauer et al., incorporated fully herein by reference.

In use, the key administrator 102 generates a GTK for use by the group member communication devices 100a, b to encrypt/decrypt traffic. The key administrator 102 passes the current unencrypted GTK to the distribution facility 104 where it is stored unencrypted. Prior to distribution to the individual group member communication devices, the GTK is encrypted using individual secrets that are unique to the individual group member communication devices. The encrypted GTKs (EGTKs) are then transferred to the individual group member communication devices 100a, b. For example, to transfer the GTK to the group member #1 communication device 100a, the distribution facility 104 encrypts the GTK using an individual secret known to the distribution facility 104 and to the group member #1 communication device 100a and transfers the resultant EGTK to the group member #1 communication device 100a. Likewise, to transfer the GTK to the group member #2 communication device 100b, the distribution facility 104 encrypts the GTK using an individual secret known to the distribution facility 104 and to the group member #2 communication device 100b and transfers the resultant EGTK to the group member #2 communication device 100b. The individual group member communication devices 100a, b, using previously stored individual secrets identical to the individual secrets used by the distribution facility 104 to encrypt the GTK, decrypt the GTK for use in encrypting/decrypting traffic between group devices 100a, b.

The individual secrets are stored on the group member communication devices 100a, b prior to distribution of the communication devices to authorized users. Each communication device 100a, b is assigned to an authorized user and stores one or more individual secrets associated with that user. The individual secrets are stored in an electronic format that cannot be viewed or updated by the user. Accordingly, for secure communications, an authorized user must use the assigned communication device in order to possess and use the individual secrets associated with that user.

The encryption key distribution system described in reference to FIG. 1 is commonly used in the communication systems employed by many private organizations and by public service organizations, such as police, fire, and ambulance squads. The key administrator 102 and the group member communication devices 100a, b are typically secure, i.e., are under the direct control of a particular organization and its associated personnel. Typically, however, multiple groups use a single key distribution and storage facility 104 that is under the control of a third party, e.g., a private corporation. For example, in a communication system for use by a police department, the police department maintains control over a key administrator 102 that resides on its premises and police officers maintain control over the individual group member communication devices 100a, b. The distribution facility 104, however, is typically managed by an organization that is not under the direct control of the police department. Since the distribution facility 104 is under the control of a third party, it is potentially unsecure. Therefore, the potential exists for unauthorized users to gain access to the GTKs stored on the unsecure key distribution and storage facility 104, thereby compromising the integrity of the communication system.

SUMMARY OF THE INVENTION

The present invention provides for a method and system for securely distributing secrets in a secure communication system in which each user that belongs to a group shares the same secret (i.e., a group secret). Group secrets are used to encrypt group traffic keys for groups to which a user belongs. In the present invention, a user group record containing the group secrets for a particular user is encrypted using a user secret known to the user. The user supplies the user secret to a communication device and the user group record containing the group secrets for that user are distributed to that communication device. Using the supplied user secret, the user communication device decrypts the user group record and extract the group secrets, which, in turn, are used to decrypt the group traffic keys. Accordingly, the user may use any compatible communication device associated with the secure communication system by simply supplying the user secret, rather than being limited to the use of a particular communication device assigned to that user as in prior art systems. In addition, the user need manage only one secret (i.e., the user secret), rather than multiple secrets (i.e., the user secret and secrets for each group to which the user belongs) as is required in a related encryption system. Thus, the user is less likely to rely on potentially unsecure methods for managing the secrets, such as creating a written record.

One aspect of the present invention is a method for distributing group encryption information. The distribution method includes encrypting a user group record for a user at an administrator using a user secret known to the administrator and to the user, the user group record including at least one group secret for a group to which the user belongs; passing the encrypted user group record to a distribution system for storage and distribution; distributing the encrypted user group record from the distribution system to a communication device associated with the user; decrypting the encrypted user group record at the communication device using the user secret to obtain the at least one group secret, the user secret supplied to the communication device by the user.

Another aspect of the invention is a system for distributing group encryption information. The system includes an administrator for encrypting a user group record using a user secret associated with a user, the user group record including at least one group secret, each of the at least one group secret associated with the user; a distribution facility for storing and distributing the encrypted user group record; and at least one device for receiving the encrypted user group record from the distribution system, the at least one group device configured to decrypt the encrypted user group record using the user secret.

DETAILED DESCRIPTION OF THE INVENTION

Figure 1:
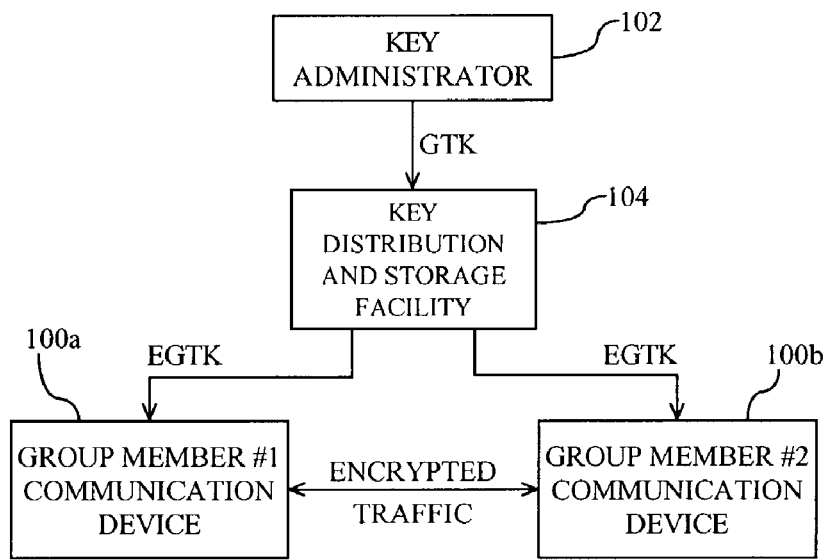
FIG. 1 is a block diagram of a prior art encryption system.
Figure 2:
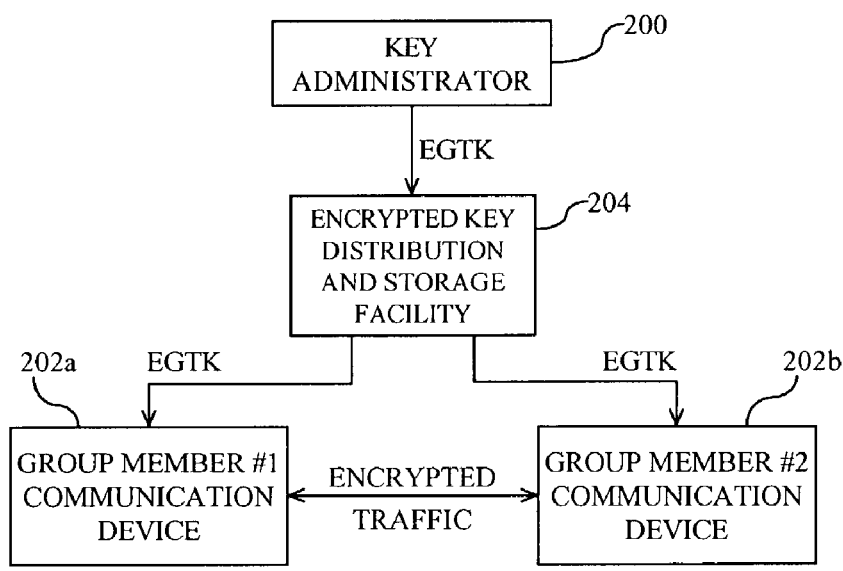
FIG. 2 is a block diagram of an encryption system related to the present invention.

FIG. 2 is a block diagram of an encryption system related to the present invention. Generally, a key administrator 200 generates a group traffic key (GTK) for encrypting/decrypting traffic between group member communication devices ("group devices") 202a, b and encrypts the GTK using a group encryption key (GEK) that is known or can be derived by each of the individual group devices 202a, b. The key administrator 200 transfers the encrypted GTK (EGTK) to an encrypted key distribution and storage facility ("distribution facility") 204 for storage. The distribution facility 204 then transfers the EGTK to the individual group devices 202a, b. The individual group devices 202a, b use the known or derived GEK to decrypt the EGTK to obtain the GTK. The individual group devices 202a, b then use the GTK to encrypt traffic for transmission to and decrypt traffic received from other group devices 202a, b. A detailed discussion of the related encryption system is found in commonly assigned, co-pending U.S. patent application Ser. No. 10/228,747, entitled SECURE ENCRYPTION KEY DISTRIBUTION, filed on Aug. 27, 2002, and incorporated fully herein by reference.

Often, a user is a member of multiple groups (e.g., a member of a police department group and of a "911" emergency group). Thus, the user must enter multiple secrets (e.g., a user secret and a group secret for each group to which the user belongs) in order to communicate with all other group members, which is particularly cumbersome if the user is a member of many groups. For example, if the user of group member #1 communication device 202a is a member of group A and group B, to communicate with both of these groups, the user must first enter a user secret to log into the communication system and then enter a group secret for group A and a group secret for group B. In addition, the users must keep their user and group secrets private to maintain the integrity of the communication system. This may be accomplished by requesting that the users memorize their user and group secrets and that they not create a written record. As the number of secrets for a particular user increases, however, the user may need to rely on potentially unsecure methods for managing their secrets, such as written records.

Figure 3:
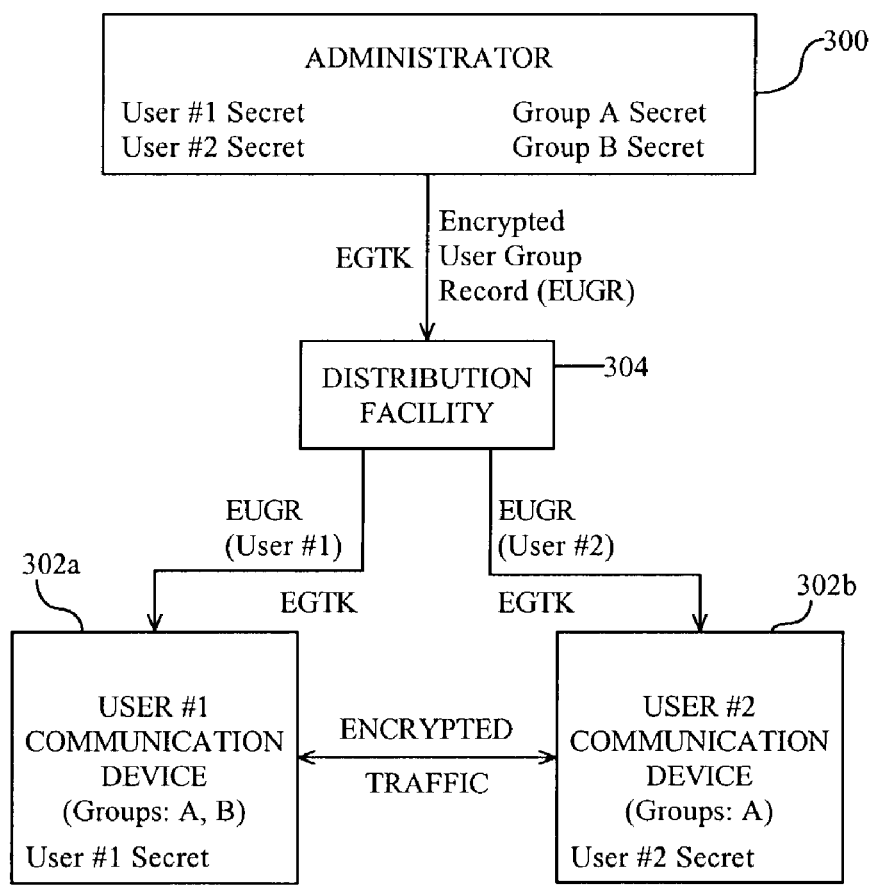
FIG. 3 is a block diagram of a group secret distribution system in accordance with the present invention.

FIG. 3 is a block diagram of a preferred group secret distribution system for use in a communication system to enable secure communication while reducing the number of secrets for which a particular user is responsible. Generally, an administrator 300 encrypts a group traffic key (GTK) associated with a group of users using a group secret (e.g., a group ID and password/pass phrase combination) common to those users to obtain an encrypted GTK (EGTK). In addition, for each user, the administrator 300 generates a user group record (UGR) containing that user's group secrets, which may be one or more depending on the number of groups to which the user belongs. For example, the UGR for user #1, who in the illustrated embodiment belongs to groups A and B, contains two group secrets (e.g., a group A secret and a group B secret), while the UGR record for user #2, who in the illustrated embodiment belongs to group A only, contains one group secret (e.g., the group A secret). The administrator 300 encrypts each UGR to obtain an encrypted UGR (EUGR) using a user secret (e.g., a user ID and password/pass phrase combination) that is known to the user and, preferably, is unique to each user. Next, the EGTKs and the EUGRs are passed to a distribution facility 304 for distribution to communication devices 302 associated with the users. At a communication device 302, e.g., communication device 302a, the EUGR is decrypted using the user secret, which is preferably supplied to the communication device 302 by the user. The communication device 302 then extracts the group secret associated with a particular EGTK from the one or more group secrets within the decrypted UGR, which, in turn, is used to decrypt that EGTK to derive the GTK. The GTK is then used to encrypt/decrypt traffic to/from other user communication devices.

The present invention is particularly well suited, although not exclusively so, for use in public and private radio communication systems such as trunked digital radio communication systems. For example, the present invention may be implemented using the existing architecture available in the OpenSky® trunked radio system available from M/A COM, Inc. of Lowell, Mass., USA. An embodiment of the present invention will now be described in detail with reference to FIG. 3A, which depicts the blocks of FIG. 3 in greater detail, with like elements having identical numbers. Two communication devices 302a, b are illustrated for descriptive purposes, however, it will be readily apparent to those skilled in the art that the present invention may be used with essentially any number of communication devices 302. In addition, although the operation of the encryption system is discussed in terms of two groups, e.g., groups A and B, it with be readily apparent to those skilled in the art that essentially any number of groups may be accommodated.

Figure 3A:
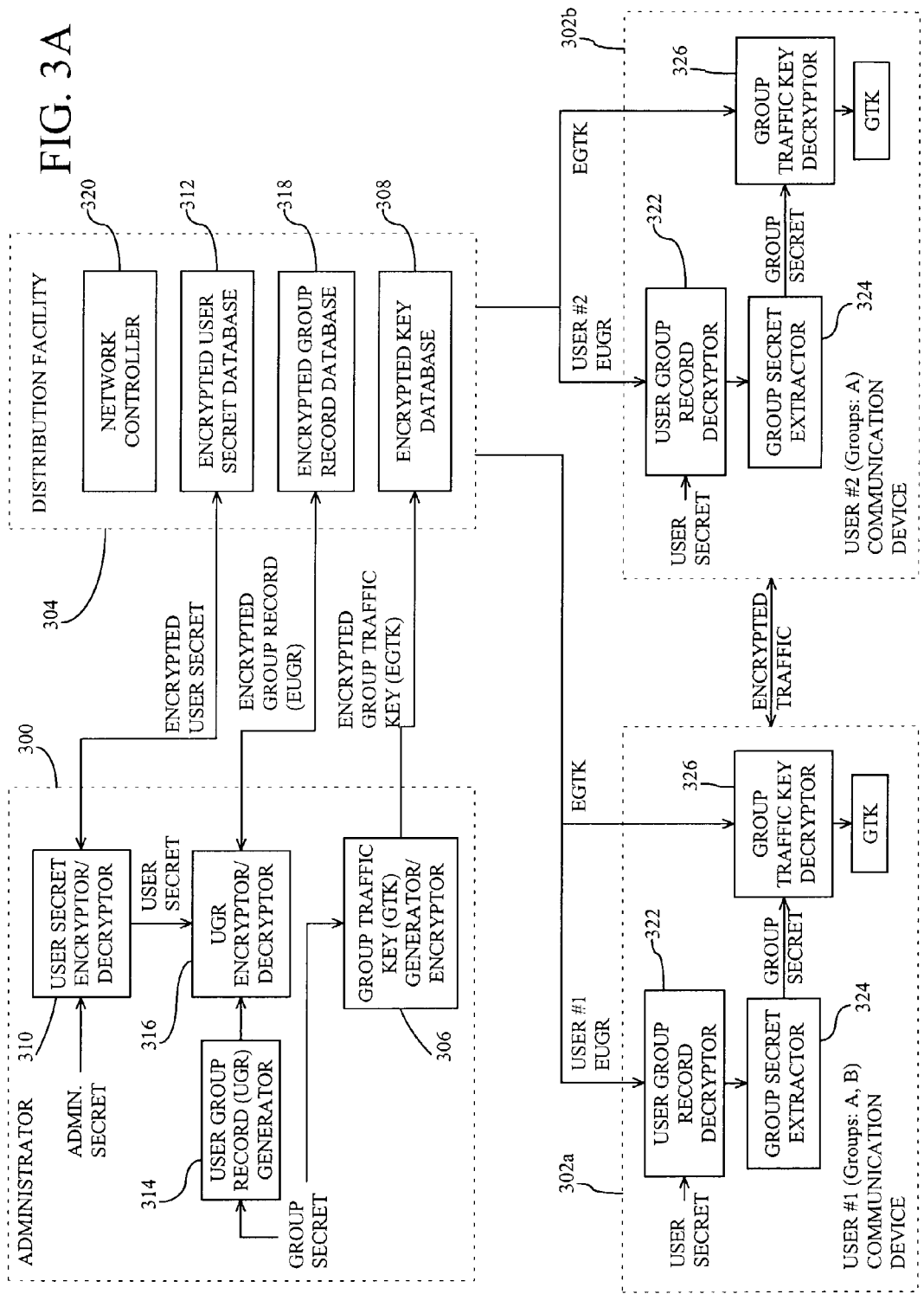
FIG. 3A is a detailed block diagram of a group secret distribution system in accordance with an embodiment of the present invention.

Referring to FIG. 3A, the administrator 300 uses a GTK generator/encryptor 306 to generate GTKs and encrypt the GTKs using group secrets. Each group of users in the communication system, e.g., group A (which includes user #1 and user #2), is associated with a GTK for encrypting/decrypting communications among group members and a corresponding group secret for encrypting/decrypting that GTK. The GTK generator/encryptor 306 encrypts each GTK using its corresponding group secret to obtain an EGTK. Preferably, the EGTK is passed to an encrypted key database 308 in the distribution facility 304 for storage prior to distribution to the communication devices 302. In an alternative embodiment, the GTK may be encrypted at the distribution facility 304 prior to distribution rather than by the administrator 300. In the preferred embodiment, the GTK remains encrypted at all points within the distribution system until it is decrypted at a user communication device 302 for use in encrypting/decrypting traffic between user communication devices 302. A detailed discussion of GTKs, their encryption, and their distribution to user communication devices is found in commonly assigned, co-pending U.S. patent application Ser. No. 10/228,747, entitled SECURE ENCRYPTION KEY DISTRIBUTION, filed on Aug. 27, 2002, and incorporated fully above by reference.

In addition to generating and encrypting the GTKs using group secrets, as will be described in detail below, the administrator 300 generates a UGR for each user containing the group secrets used to encrypt/decrypt all of the GTKs associated with that particular user and encrypts the UGR using a user secret known to that user. For example, for user #1, the administrator generates a first UGR that contains the group secrets for groups A and B and, then, encrypts the first UGR with a user secret known to user #1. For user #2, the administrator generates a second UGR that contains the group secret for group A and encrypts the second UGR with a user secret known to user #2.

The administrator 300 maintains the user secrets of the users associated with the communication system for use in encrypting/decrypting the UGRs. In the illustrated embodiment, the administrator encrypts the user secret with an administrative secret (e.g., an administrative ID and password/pass phrase combination) using a user secret encryptor/decryptor 310 and stores the encrypted user secret in an encrypted user secret database 312 residing at the distribution facility 304. When needed, the administrator 300 retrieves the encrypted user secrets from the encrypted user secret database 312 and decrypts the encrypted user secret with the administrative secret using the user secret encryptor/decryptor 310. Preferably, the user secret is encrypted by combining the administrative ID and password and applying a known secure hash, e.g. SHA-1, to the combination. The hashed combination is then applied to the user secret in a known manner. In an alternative embodiment, the user secrets reside at another location, e.g., at the administrator 300, and may or may not be encrypted. Preferably, only the user password of the user secret is encrypted. The encrypted user password is then stored with the non-encrypted user ID to obtain the encrypted user secret. This technique facilitates storage and retrieval of the encrypted user secret, which can be identified by simply searching for the non-encrypted user ID.

The administrator 300 generates a UGR for each user and encrypts the UGR using the user's associated secret. A UGR generator 314 assembles all the group secrets for a particular user to obtain a UGR. The UGR is then encrypted at a UGR encryptor/decryptor 316 using the user secret to obtain an encrypted UGR (EUGR). The EUGR is then stored in an encrypted user group record database 318 at the distribution facility 304 for distribution to an appropriate communication device 302 associated with the user. In a preferred embodiment, to encrypt/decrypt the UGR, the UGR encryptor/decryptor 316 combines the user ID and password of a user secret and applies a known secure hash, e.g., SHA-1, to the combination. The hashed combination is then applied to the UGR for encryption/decryption in a known manner. Preferably, the user ID is appended to the EUGR to facilitate storage and retrieval at the encrypted user group record database 318.

The administrator 300 updates the UGRs when changes are needed, e.g., to accommodate changes in the groups to which a user belongs or changes to the group secrets within the groups. Updates to a particular UGR may be made by retrieving the encrypted form of that UGR from the encrypted user group record database 318, decrypting the EUGR at the UGR encryptor/decryptor 316 with the user secret to obtain the UGR, updating the UGR to reflect the needed changes to the group and/or group secrets, encrypting the updated UGR at the UGR encryptor/decryptor 316 with the user secret, and storing the encrypted, updated UGR in the encrypted user group record database 318.

The distribution facility 304 stores and distributes the EUGRs. In the illustrated embodiment, the encrypted user group record database 318 stores the EUGRs and a network controller 320 distributes the stored EUGRs to the appropriate user communication device 302. Preferably, as described above, storage and distribution of the EUGRs is facilitated through the use of a user ID appended to each EUGR by the administrator 300. The distribution of the EUGRs by the network controller 320 to the user communication devices 302 is described in greater detail below. In addition to distributing the EUGRs, the network controller 320 may perform other functions associated with conventional communication systems such as distributing EGTKs and tracking group members and their privileges. In addition, the network controller 320 may manage traffic between group devices 302. In a preferred embodiment, the network controller 320 is a conventional controller such as the software implemented Voice Network Interface Controller (VNIC) housed on a Sun™ workstation in an OpenSky® communication system.

The user communication devices 302 derive the group secrets needed to decrypt the EGTK from the EUGRs using the user secrets used to encrypt the EUGRs. In the illustrated embodiment, each communication device 302 includes a UGR decryptor 322, a group secret extractor 324, and a group traffic key decryptor 326. In a preferred embodiment, the communication devices are mobile radios such as the Mercury Series Mobile Radio (M-801), which is a software-based mobile radio that supports the OpenSky® communication protocol in the 800 MHz frequency band.

The UGR decryptor 322 receives the EUGR and decrypts the EUGR to obtain the UGR using the user secret entered by the user (and which was used by the administrator 300 to encrypt the UGR). Preferably, the user secret is supplied to the communication device 302 by an authorized user of the communication device, e.g., when logging onto the communication system. In a preferred embodiment, during decryption, as described above in reference to the UGR encryptor/decryptor 316, the UGR decryptor 322 combines the user ID and password of a user secret and applies a known secure hash to the combination. The hashed combination is then used to decrypt the EUGR in a known manner to obtain the UGR.

The group secret extractor 324 extracts the group secrets for a user from the UGR. Preferably, the group secret extractor 320 parses the UGR in a known manner to identify the group secrets and selects the group secret for decrypting each particular EGTK.

The group traffic key decryptor 326 receives the EGTKs and decrypts the EGTKs in a known manner using the group secrets selected by the group secret extractor 324 to obtain the GTKs generated (and, preferably, encrypted) by the administrator 300. The GTKs are then used in a conventional manner to encrypt/decrypt traffic between communication devices 302. A detailed description of the decryption of the EGTK and the use of the GTK in encrypting/decrypting traffic is found in commonly assigned, co-pending U.S. patent application Ser. No. 10/228,747, entitled SECURE ENCRYPTION KEY DISTRIBUTION, filed on Aug. 27, 2002, and incorporated fully above by reference.

In a preferred embodiment, the communication devices 302 each contain a memory (not shown) for storing the EUGR. Thus, the EUGR need only be passed to the communication device 318 when the EUGR is updated, thereby increasing efficiency. Preferably, the EUGR is stored in the memory and retrieved and decrypted only when needed. Since the UGR is stored in an encrypted format, the UGR and, thus, the group secrets within the UGR will remain secure even if the communication device 318 is in the possession of an unauthorized user, thereby increasing the integrity of the system.

In a preferred use, a user logs into a communication system by entering into a communication device 302, e.g., communication device 302a, a user secret, which is associated with and unique to the user. The communication device 302a passes the user secret to the network controller 316. The network controller 316 verifies the identity of the user, checks to see if the communication device 302a has the current UGR for the user, and, if the UGR is not current, transfers the current UGR in encrypted format to the communication device 302a where it is stored locally. Once logged into the communication system, the network controller 316 monitors the encrypted user group record database 318 for entries by the administrator 300 associated with the communication device 302a and transfers to the communication device 302a the current UGR in encrypted format whenever it is updated by the administrator 300.

Preferably, when the encrypted user group record database 314 is updated with a new encrypted UGR for the user, e.g., user #1, the network controller 316 transfers the EUGR to the communication device 302a if it is logged into the communication system. In addition, the network controller 320 tracks when the user communication device 302a is logged into the communication system. If the network controller 320 determines that the communication device 302a associated with the user was not logged into the communication system when the current EUGR was stored in the encrypted user group record database 318, the network controller 320 passes the EUGR to the communication device 302a the next time the user of the communication device 302a logs into the communication system.

When traffic is generated by a first communication device 302, e.g, user #1 communication device 302a, for transmission to one or more second communication devices 302, e.g., user #2 communication device 302b, the traffic is encrypted by the first communication device 302a using the GTK for a group containing user #1 and user #2. More specifically, the first communication device 302a encrypts the traffic by decrypting the locally stored EUGR with the user secret and extracting a group secret for decrypting the locally stored EGTK. The EGTK is then decrypted using the group secret and the resultant GTK is used to encrypt the traffic. The second communication device 302b decrypts the traffic by decrypting the locally stored EUGR with the user secret and extracting a group secret for decrypting the locally stored EGTK. The EGTK is then decrypted using the group secret and the resultant GTK is used to decrypt the traffic.

If an original user secret becomes known to individuals other than an authorized user or a communication device that is logged into the system is in the possession of such an individual, security can be restored to the communication system by updating the user secret, e.g., by changing the user's password. In a preferred embodiment, updates to the user secret are performed at the administrator 300. Preferably, an update to a user's secret prompts the administrator 300 to update the UGR associated with the user. In a preferred embodiment, the administrator 300 updates the UGR by retrieving the EUGR from the encrypted user group record database 318. The EUGR is then decrypted to obtain the UGR. Finally, the UGR is encrypted using a new user secret and the resultant EUGR is stored in the encrypted user group record database 318. In an alternative embodiment, a new EUGR encrypted using the new user secret may be generated by the administrator 300 and passed to the encrypted user group record database 318 where it replaces the original EUGR. If a communication device 302 is logged into the communication system using the original user secret, the new EUGR is passed to the communication device 302 once the EUGR is stored in the encrypted user group record database 318. If the communication device 302 is not logged into the communication system, the distribution facility 304 passes the new EUGR encrypted using the new user secret to the communication device 302 upon login. Since, in either case, the original user secret known to the communication device 302 will not match the new user secret, the communication device 302 will be unable to decrypt the new EUGR, unless the user presents the new user secret. Accordingly, security is restored to the communication system.

Thus, a method and system for securely distributing group secrets is disclosed. The group secrets are encrypted (e.g., as part of a user group record) using a user secret at the administrator prior to storage at a distribution facility. The group secrets are then distributed to the appropriate user communication device where they are decrypted using the user secret for use in encrypting/decrypting group traffic keys. By encrypting the group secrets at the administrator using a user secret and only decrypting the group secrets at the group devices, the management of the group secrets from the user perspective is simplified and the integrity of the communication system is strengthened.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A communication system comprising:
   at least one server; and
   a plurality of groups of nodes communicating with said at least one server, each node having a user associated therewith, respective nodes within a given group communicating with each other and encrypting traffic therebetween based upon a group traffic key;
   said at least one server configured to
      generate for each given node a corresponding user group record comprising at least one group key for at least one group that the given node is a member thereof, receive a user generated user key from the given node and verify the user of the given node using the user generated user key, determine if a stored encrypted user group record at the given node is current, if the user is verified and the stored encrypted user group record is out of date, then encrypt the corresponding user group record based upon a respective user key for the given node, and transmit the encrypted user group record to the given node, and encrypt, for each group, the group traffic key based upon a respective group key and transmit the encrypted group traffic key to nodes being a member of the respective group;

the given node configured to decrypt the encrypted user group record for accessing the at least one group key, and to decrypt the encrypted group traffic key based upon the at least one group key.

2. The communication system of claim 1 wherein said at least one server comprises a key server and a distribution server cooperating therewith; and wherein said key server is configured to:

store the corresponding user keys for the nodes and the corresponding group keys for the plurality of groups;

encrypt the corresponding user group records for the nodes and the corresponding group traffic keys for the plurality of groups; and transmit the encrypted user group records and group traffic keys to said distribution server.

3. The communication system of claim 2 wherein said distribution server is configured to store the encrypted user group records and group traffic keys, and to transmit the encrypted user group records and group traffic keys to the respective nodes.

4. The communication system of claim 2 wherein said key server is configured to encrypt the corresponding user keys for the nodes based upon an administrator key, and to store the encrypted user keys.

5. The communication system of claim 1 wherein the given node is a member of a plurality of groups; and wherein said at least one server is configured to generate the corresponding user group record to comprise a plurality of group keys for the plurality of groups that the given node is a member thereof.

6. The communication system of claim 1 wherein for each node, the respective user key comprises a user identification and password combination; and wherein for each group, the respective group key comprises a group identification and password combination.

7. The communication system of claim 1 wherein the given node is configured to receive the respective user key from the respective user.

8. A server operating in a communication system comprising a plurality of groups of nodes communicating with the server, each node having a user associated therewith, respective nodes within a given group communicating with each other and encrypting traffic therebetween based upon a group traffic key, the server comprising:

a memory; and a processor cooperating with said memory and being configured to generate for each given node a corresponding user group record comprising at least one group key for at least one group that the given node is a member thereof, receive a user generated user key from the given node and verify the user of the given node using the user generated user key, determine if a stored encrypted user group record at the given node is current, if the user is verified and the stored encrypted user group record is out of date, then encrypt the corresponding user group record based upon a respective user key for the given node, and transmit the encrypted user group record to the given node, and encrypt, for each group, the group traffic key based upon a respective group key and transmit the encrypted group traffic key to nodes being a member of the respective group, the given node configured to decrypt the encrypted user group record for accessing the at least one group key, and to decrypt the encrypted group traffic key based upon the at least one group key.

9. The server of claim 8 wherein said processor is configured to:

store the corresponding user keys for the nodes and the corresponding group keys for the plurality of groups;

encrypt the corresponding user group records for the nodes and the corresponding group traffic keys for the plurality of groups; and transmit the encrypted user group records and group traffic keys to a distribution server.

10. The server of claim 9 wherein said processor is configured to encrypt the corresponding user keys for the nodes based upon an administrator key, and to store the encrypted user keys.

11. The server of claim 8 wherein the given node is a member of a plurality of groups; and wherein said processor is configured to generate the corresponding user group record to comprise a plurality of group keys for the plurality of groups that the given node is a member thereof.

12. The server of claim 8 wherein for each node, the respective user key comprises a user identification and password combination; and wherein for each group, the respective group key comprises a group identification and password combination.

13. The server of claim 8 wherein the given node is configured to receive the respective user key from the respective user.

14. A method of operating a communication system including a at least one server, and a plurality of groups of nodes communicating with the at least one server, each node having a user associated therewith, the method comprising:

respective nodes within a given group communicating with each other and encrypting traffic therebetween based upon a group traffic key;

using the at least one server to generate for each given node a corresponding user group record comprising at least one group key for at least one group that the given node is a member thereof;

using the at least one server to receive a user generated user key from the given node and to verify the user of the given node using the user generated user key, to determine if a stored encrypted user group record at the given node is current, and if the user is verified and the stored encrypted user group record is out of date, then to encrypt the corresponding user group record based upon a respective user key for the given node, and transmit the encrypted user group record to the given node;

using the at least one server to encrypt, for each group, the group traffic key based upon a respective group key and transmit the encrypted group traffic key to nodes being a member of the respective group; and the given node decrypting the encrypted user group record for accessing the at least one group key, and decrypting the encrypted group traffic key based upon the at least one group key.

15. The method of claim 14 wherein the at least one server comprises a key server and a distribution server cooperating therewith; and further comprising:
   using the key server to store the corresponding user keys for the nodes and the corresponding group keys for the plurality of groups;
   using the key server to encrypt the corresponding user group records for the nodes and the corresponding group traffic keys for the plurality of groups; and
   using the key server to transmit the encrypted user group records and group traffic keys to the distribution server.

16. The method of claim 15 further comprising using the distribution server to store the encrypted user group records and group traffic keys, and to transmit the encrypted user group records and group traffic keys to the respective nodes.

17. The method of claim 15 further comprising using the key server to encrypt the corresponding user keys for the nodes based upon an administrator key, and to store the encrypted user keys.

18. The method of claim 14 wherein the given node is a member of a plurality of groups; and further comprising using the at least one server to generate the corresponding user group record to comprise a plurality of group keys for the plurality of groups that the given node is a member thereof.

19. The method of claim 14 wherein for each node, the respective user key comprises a user identification and password combination; and wherein for each group, the respective group key comprises a group identification and password combination.

20. The method of claim 14 further comprising the given node receiving the respective user key from the respective user.

* * * * *